UNITED STATES PATENT OFFICE.

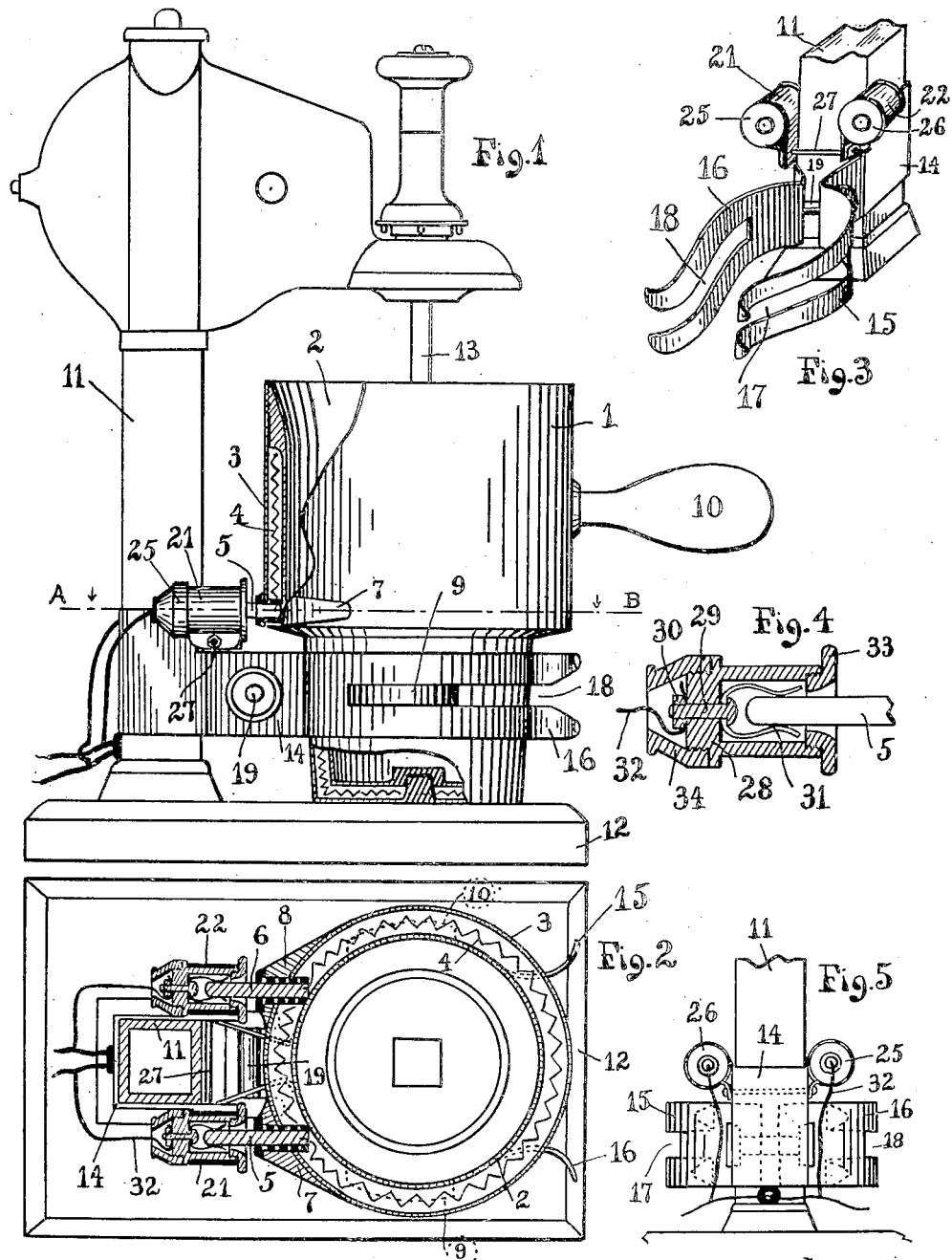

WILLIAM P. ROBERTSON, OF NEW YORK, N. Y., ASSIGNOR TO WILLIAM HENRY JOHNSTON, OF NEW YORK, N. Y.

FOOD AND BEVERAGE MIXER.

1,227,935.      Specification of Letters Patent.      Patented May 29, 1917.

Application filed June 15, 1916. Serial No. 103,827.

*To all whom it may concern:*

Be it known that I, WILLIAM P. ROBERTSON, a citizen of the United States, and a resident of the borough of Manhattan, city of New York, county and State of New York, have invented new and useful Improvements in Food and Beverage Mixers, of which the following is a specification.

My invention relates generally to food and beverage mixers having means for heating the container or vessel and its contents while the latter is being agitated or mixed.

My invention is particularly adapted to be used in connection with food and beverage mixers having an upright or standard for supporting the mixing means.

One of the objects of my invention is to provide a food and beverage mixer with means for electrically heating the vessel or container and its contents while the latter is being agitated or mixed.

Another object of my invention is to provide the vessel or container used with a food and beverage mixer with an electrical heating element, said vessel or container being provided with means whereby said heating element can be electrically connected with or disconnected from the source of current supply.

Another object of my invention is to provide the vessel or container with means whereby electrical connection will be quickly and automatically made when the vessel or container is placed in operative position.

Another object of my invention is to provide a food and beverage mixer with electrical connectors or sockets that can be removed if it is desired to use the mixer without heating the contents of the vessel.

Other and further objects of my invention will be apparent from the detailed description to follow.

My invention is shown by the construction, combination and arrangement of parts as is hereinafter more fully described and illustrated in the accompanying drawings, in which—

Figure 1 shows a side elevation of one type of food and beverage mixer in operative position, certain parts being cut away to more clearly show the details of construction.

Fig. 2 is a sectional plan view taken on the line A—B of Fig. 1 looking in the direction of the arrows.

Fig. 3 is a perspective view of a portion of the upright standard of the mixer showing the expanding metal holder and electrical sockets secured thereto.

Fig. 4 is an enlarged sectional view of one of the electrical sockets.

Fig. 5 is a back plan view of a portion of the standard showing the expanding metal holder and electrical sockets secured thereto.

Referring to Fig. 1, the food and beverage mixer shown therein, which may be of the same type as shown in my pending application Serial No. 67,964, comprises the base 12, an upright standard 11 secured thereto, and a mixer or agitating spindle 13 adapted to be driven by an electric motor secured to the upper portion of the standard 11.

Secured to the lower portion of the standard is an expanding or resilient metal holder 14 having prongs 15 and 16 which are provided with slots or openings 17 and 18 respectively. These prongs 15 and 16, which are preferably of some resilient metal, are held in adjustable position by the screw-threaded bolt 19. The upper portion of the member 14 on the sides of the standard 11 is preferably carried forward beyond the face of the standard and upwardly to form the supporting members or bands 21 and 22. These supporting members are bent around to firmly hold in position the electric sockets 25 and 26 which are firmly clamped in position by means of the bolt 27 having a screw nut on one end. The bolt 27 also serves to hold the member 14 and its component parts firmly in position with respect to the standard 11.

1 represents a vessel or container, that can be heated electrically, in which the contents are mixed or agitated by the agitating means driven by the electric motor secured to the upper portion of the standard 11. As shown, the vessel or container 1 comprises an inner metal casing 2 secured to an outer metal casing 3. Within and between these casings but insulated therefrom is a heating element 4. Secured to the vessel but insulated therefrom are the metal plugs 5 and 6 which are connected to the heating element 4 so that when an electric current passes through 5, it will pass through the heating element 4 and thence to the plug 6 thereby heating the vessel or container and its contents. These plugs 5 and 6 are preferably secured to the vessel 1 by the members 7 and 8, as shown in Fig. 2. In order to provide the requisite capacity, the vessel 1 is preferably made with an enlarged upper section and a contracted lower section which is provided on opposite sides thereof with outwardly-extending guides or lugs 9 and 10, as shown in dotted lines in Fig. 2. These guides or lugs are adapted to enter the slots 17 and 18 in the prongs 15 and 16 respectively of the expanding or resilient metal holder 14. The vessel or container 1 is also preferably provided with a handle 10.

The electric sockets 25 and 26 are adapted to receive the electric plugs 5 and 6 respectively. As shown in Fig. 4 each of these electric sockets comprises a receptacle 28 of any suitable non-conductive material through the base of which is passed a metal bolt 29 having a metal nut 30. The bolt 29 passes through and serves to hold centrally in position in receptacle 28 the resilient metal member 31. A cap 33 of non-conductive material and having a flared opening is secured to the head of the receptacle 28. The receptacle 28 is also provided at its rear end with the cap 34 of non-conductive material for properly protecting the electrical connection between the electric wire 32 and the bolt 29.

When the vessel or container 1 is moved into operative position between the prongs 15 and 16 of the expanding holder 14, the guides 9 and 10 will enter the slots 17 and 18 and the plugs 5 and 6 will enter the electric sockets 25 and 26 thereby putting the heating element 4 in electrical connection with the source of current supply so that the vessel and contents can be heated during the mixing operation.

If however it is not desired to heat the vessel or container and its contents, the electric sockets 25 and 26 can be removed by loosening the bolt 27, or, if preferred, an ordinary glass vessel or container may be used without the necessity of removing the sockets 25 and 26.

While I have shown and described the preferred embodiment of my invention, I do not wish to limit myself to the precise construction shown and described as the construction and arrangement of parts herein shown and described can be varied without, however, departing from the scope of my invention.

What I claim is:

1. In combination, a mixing device having a stirring element, an electric heating vessel, and current connecting means adapted to be engaged by the heating vessel when brought into operative position with respect to the stirrer.

2. In combination, a mixing device having electric current connectors thereon, and an electric heating vessel adapted to operatively engage the current connectors when brought into operative position with respect to the mixer.

3. In a food and beverage mixer, in combination, a standard, a vessel or container provided with a heating element, agitating means mounted on said standard and insertible in said vessel, a member secured to said standard for holding said vessel in operative position, and means electrically connecting said heating element with a source of current supply by placing said vessel or container in said operative position.

4. In a food and beverage mixer, in combination, a standard, electrically-driven agitating means carried thereby, slotted resilient members secured to said standard, a vessel or container having an electric heating element in the walls thereof and provided with outwardly extending lugs or projections for engaging the slotted portions in said resilient members when said vessel is in operative position, and an electric circuit comprising said heating element, which circuit is completed by placing said vessel in said operative position where the agitating or mixing operation can be performed.

5. In a food and beverage mixer, in combination, a standard, a vessel or container provided with a heating element, agitating means mounted on said standard and insertible in said vessel, a member secured to said standard for holding said vessel in operative position, and an electric circuit comprising said heating element, which circuit is completed by placing said vessel in position where the agitating operation can be performed.

6. In a food and beverage mixer, in combination, a standard, a vessel or container having means whereby it can be electrically heated and provided with two outwardly extending plugs or connectors, agitating means mounted on said standard and insertible in said vessel, and a pair of electric sockets associated with said standard and adapted to receive said plugs or connectors for making electrical connection with a source of current supply as said vessel is placed in operative position.

7. In a food and beverage mixer, in combination, a vessel or container provided with a heating element whereby it can be electrically heated, agitating means on said standard and insertible therein, and means automatically connecting electrically said heating element with a source of current supply as the vessel is placed in operative position.

8. In a food and beverage mixer, in combination, a base, a standard secured thereto, two outwardly-extending resilient members secured to said standard, a vessel or container provided with a heating element whereby it can be electrically heated, agitating means carried by said standard and insertible in said vessel, and means when in operative position automatically connecting said heating element to a source of current supply as said vessel or container is placed in operative position between said resilient members.

9. In a food and beverage mixer, in combination, a standard, a vessel or container provided with an electric heating element, agitating means on said standard and insertible in said vessel, means for holding the vessel or container in operative position, the terminals of said heating element being lugs or projections extending outside said vessel or container, and adjustably-mounted means secured to said standard for making electrical connection with said lugs or projections when the vessel or container is placed in position where the agitating operation can be performed.

10. In a device of the class described, in combination, a vessel or container provided with an electric heating element, the terminals of said heating element being lugs or projections extending from said vessel or container, a standard carrying agitating means which may be inserted into said vessel or container, means for holding the vessel or container in operative position with relation to said upright and agitating means, and adjustably-mounted means secured to said upright for making electrical connection with the lugs or projections of the heating element when the vessel or container is placed in position where the agitating operation can be performed.

11. In combination, a mixing device having a stirring element, an electric heating element, and current connecting means adapted to be engaged by the heating element when brought into operative position with respect to the stirrer.

12. In combination with a vessel or container for holding a liquid of a member insertible in said vessel for agitating the liquid therein, a heating element in said vessel, and current connecting means adapted to be engaged by bringing the vessel into position with respect to the agitating member.

This specification signed and witnessed this 14th day of June, 1916.

WILLIAM P. ROBERTSON.

Signed in the presence of—
W. C. MARGESON,
G. McGRANN.